US012336621B2

(12) United States Patent
Bohmbach et al.

(10) Patent No.: US 12,336,621 B2
(45) Date of Patent: Jun. 24, 2025

(54) LADDER CARRIER SYSTEM

(71) Applicant: Tenacious Holdings, Inc., St. Paul, MN (US)

(72) Inventors: Nathan Bohmbach, Lakeville, MN (US); Matthew Hahn, Minneapolis, MN (US); Dominique Aris, Rolling Hills Estates, CA (US)

(73) Assignee: Tenacious Holdings, Inc., St. Paul, MN (US)

( * ) Notice: Subject to any disclaimer, the term of this patent is extended or adjusted under 35 U.S.C. 154(b) by 0 days.

(21) Appl. No.: 17/865,006

(22) Filed: Jul. 14, 2022

(65) Prior Publication Data

US 2023/0404244 A1 Dec. 21, 2023

Related U.S. Application Data

(63) Continuation-in-part of application No. 29/839,911, filed on May 24, 2022.

(51) Int. Cl.
*A45F 3/14* (2006.01)
*E06C 7/00* (2006.01)

(52) U.S. Cl.
CPC .................. *A45F 3/14* (2013.01); *E06C 7/00* (2013.01); *A45F 2003/142* (2013.01)

(58) Field of Classification Search
CPC .......................................................... A45F 3/14
USPC .................................................. 224/160, 917
See application file for complete search history.

(56) References Cited

U.S. PATENT DOCUMENTS

| | | | | | |
|---|---|---|---|---|---|
| 429,766 | A * | 6/1890 | Lee | A45F 5/10 | 294/157 |
| 4,724,989 | A * | 2/1988 | Silberberg | A63C 11/023 | 294/157 |
| 4,911,347 | A * | 3/1990 | Wilhite | A45F 3/14 | 224/264 |
| 4,998,653 | A * | 3/1991 | LaBelle | A45F 5/00 | D3/226 |
| D320,696 | S * | 10/1991 | Butler | D3/259 | |
| 5,318,084 | A * | 6/1994 | Jackson | A45F 3/00 | 224/264 |
| D349,188 | S * | 8/1994 | Powers | D3/259 | |
| 5,370,286 | A * | 12/1994 | Newman | A45F 3/14 | 119/857 |
| 5,397,040 | A * | 3/1995 | Lee | A01K 97/06 | 224/240 |
| 5,511,285 | A * | 4/1996 | Bush | B65G 7/12 | 294/170 |
| 5,762,242 | A * | 6/1998 | Yost | A63C 11/021 | 224/258 |
| 5,829,656 | A * | 11/1998 | Reitz | B62J 11/00 | 294/154 |

(Continued)

*Primary Examiner* — Nathan J Newhouse
*Assistant Examiner* — Lester L Vanterpool
(74) *Attorney, Agent, or Firm* — Skaar Ulbrich Macari, PA

(57) ABSTRACT

A multi-strap device used to carry a ladder in a horizontal orientation. The ladder carrier system is comprised of central straps configured to attach to the upper rail of a ladder with an integrated handle and pouch. The central straps comprise a cinch strap to secure the ladder from opening or extending. Straps outboard the central straps are configured to further secure the ladder for transport and to provide anchor points for the attachment of a shoulder strap. The pouch contains one or more integrated pockets to store straps when the system in not deployed.

17 Claims, 3 Drawing Sheets

(56) References Cited

U.S. PATENT DOCUMENTS

| | | | | |
|---|---|---|---|---|
| 6,193,012 | B1 * | 2/2001 | Olivas | E06C 7/50 224/257 |
| 6,672,494 | B1 * | 1/2004 | Fernandez | E06C 7/00 224/268 |
| 7,976,088 | B1 * | 7/2011 | Diciolla | A45C 13/42 294/157 |
| 8,616,600 | B2 * | 12/2013 | Owen | A63C 11/021 294/154 |
| 10,464,727 | B1 * | 11/2019 | Rerecich | B65D 63/10 |
| 10,793,064 | B2 * | 10/2020 | Troeger | B60N 3/023 |
| 2013/0009414 | A1 * | 1/2013 | LeClaire | E06C 7/00 294/151 |
| 2013/0313853 | A1 * | 11/2013 | Marcus | B60J 3/0273 296/97.7 |

* cited by examiner

LADDER CARRIER SYSTEM

CROSS-REFERENCE TO RELATED APPLICATIONS

This application is a continuation-in-part of U.S. patent application Ser. No. 29/839,911, filed May 24, 2022, which is hereby incorporated herein by reference in its entirety.

FIELD OF THE INVENTION

Embodiments of the present disclosure relate generally to a device that allows a user to transport various types of ladders safely, comfortably and easily.

BACKGROUND OF THE INVENTION

The need to transport ladders from place to place is nearly inevitable. Whether from job site to job site, from a vehicle to a job site, from storage to a job site, or back again, ladders most always need to be moved. Yet carrying a ladder, be it an extension, step or multipurpose ladder, can be a difficult, and at times an unsafe task. This is especially the case when moving long and heavy ladders. Moving heavy and long ladders by hand can be unwieldly and can increase the likelihood of unwanted collisions and damage. A quick, safe and more comfortable way to lift and transport ladders is needed. The present ladder carrier fulfills these needs.

SUMMARY OF THE INVENTION

The ladder carrier system attaches to a horizontally positioned ladder. The ladder carrier invention system comprises a pouch assembly comprising one or more pockets, a shoulder strap assembly and auxiliary straps. The pouch assembly comprises a padded pouch integrated with a handle and preferably three connecting straps. The shoulder strap assembly preferably comprises a padded section with two clip bearing ends. Preferably two auxiliary straps are each configured to attach to the ladder outboard of the pouch assembly and provide connection points for the shoulder straps. With a ladder positioned horizontally, the ladder carrier assembly is attached to the upper portion of the ladder frame, preferably at the balance point about halfway between the base and top of the ladder. The ladder carrier pouch assembly consists of at least three straps, one of which is longer than the other two. The straps are placed around the upper frame leg and secured in place by hook and loop or other means. The longer strap is intended to accommodate wider ladders, such as A-frame type step ladders, and is long enough to secure the two sections of the frame together in the closed position. The handle is then used to lift the ladder for transport. The shoulder strap that is attachable by way of two auxiliary straps may be used to aid in the transport of heavier ladders. The preferred 5 strap configuration plus the use of the shoulder strap allows for the controlled, safe and comfortable transport of a ladder. The pouch is padded and is configured to lie between the ladder and the user to provide the user some protection from the weight and movement of the ladder during transport. The pouch is also configured with pockets to accommodate the storage of the shoulder strap or other objects, and is accessible when the ladder is in its vertical in-use position.

BRIEF DESCRIPTION OF THE DRAWING

Embodiments of the present disclosure will be readily understood by the following detailed description in conjunction with the accompanying drawings. Embodiments of the invention are illustrated by way of example and not by way of limitation in the figures of the accompanying drawings.

DETAILED DESCRIPTION OF THE INVENTION

Figure 1:
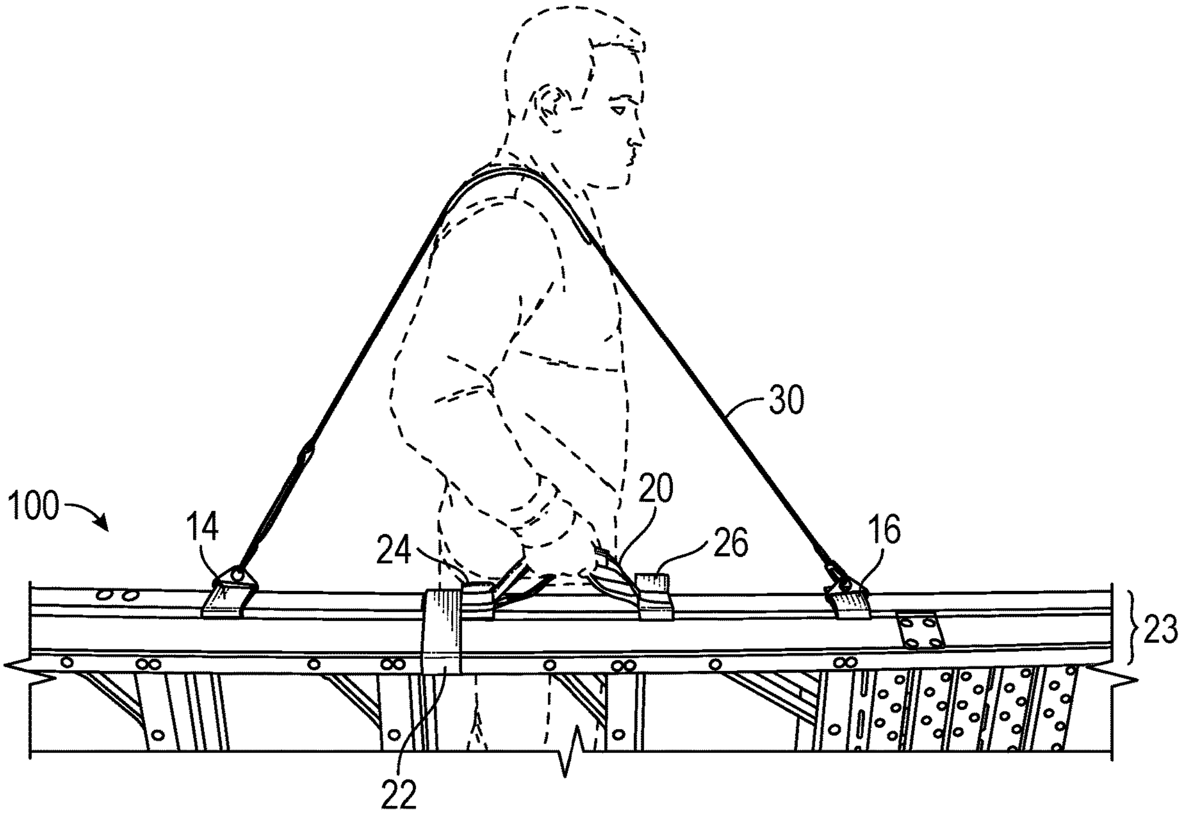
FIG. 1 illustrates a preferred embodiment of the ladder carrier system attached to an exemplary ladder.
Figure 2:
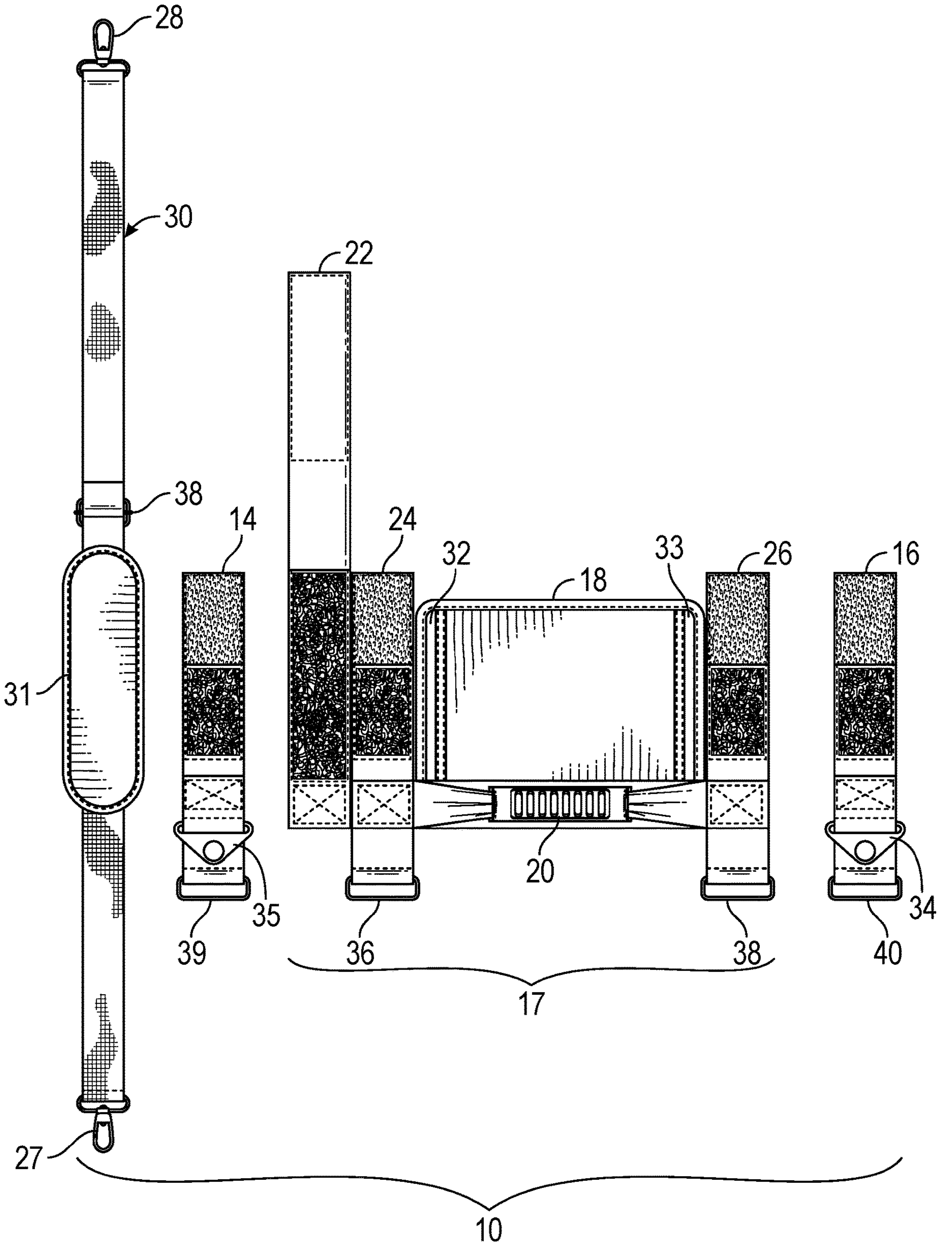
FIG. 2 illustrates the various preferred components of the ladder carrier system.
Figure 3:
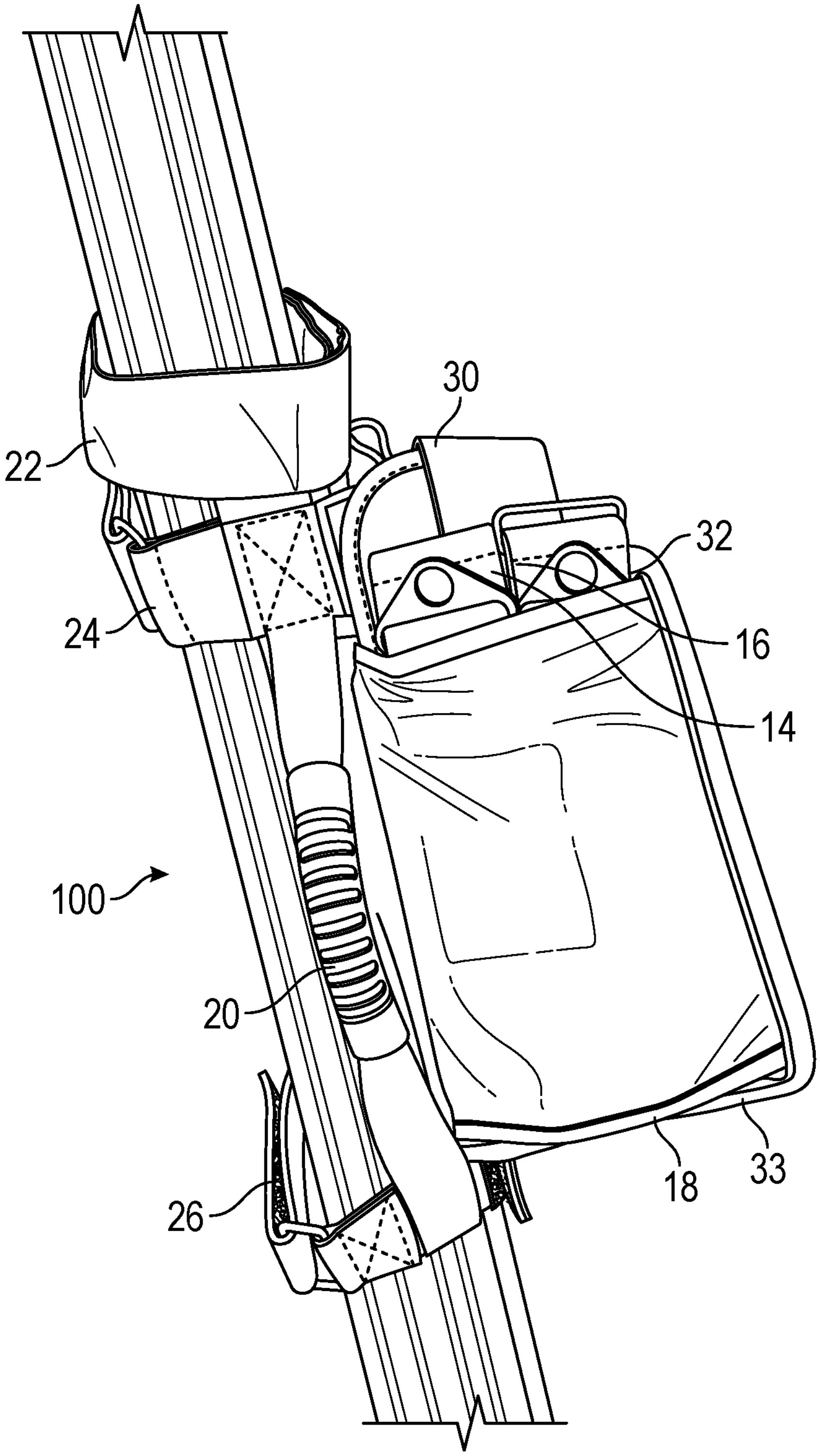
FIG. 3 illustrates the ladder carrier system in its undeployed state and illustrates the storage capabilities of the system.

FIGS. 1-3 illustrate a preferred embodiment of the ladder carrier system and are not intended to limit the scope of the claims.

FIGS. 1-2 illustrate the ladder carrier system in its deployed state. Ladder carrier system is comprised of pouch assembly 17, auxiliary straps 14 and 16, and shoulder strap 30. The pouch assembly 17 is preferably comprised of pouch 18, handle 20, cinch strap 22, and pouch straps 24 and 26. Pouch straps 24 and 26 are attached to pouch 17 at an upper perimeter on either end of pouch 17. Cinch strap 22 is attached adjacent to one of the pouch straps. The straps 22, 24 and 26 are attached to pouch assembly 17 such that the majority of the strap length is free to allow for wrapping and securing around the ladder. Pouch assembly 17 is attached to a ladder, orientated horizontally, by securing cinch strap 22 around the entire portion of the upper ladder rail 23. In the case of an A-frame ladder, for example, the collapsed ladder frame would have two sections. Cinch strap 22 is secured around both sections to keep the ladder sections from separating during transport. Pouch straps 24 and 26 are secured around at least one section of rail 23. It is preferred that pouch assembly 17 is secured at a midpoint of the ladder to allow for a balanced transport. Shoulder strap 30 is preferably attached to the ladder via auxiliary straps 14 and 16. Auxiliary straps 14 and 16 are preferably placed outboard and on either side of pouch assembly 17, and placed to provide a stable foundation for shoulders strap 30 when attached.

Shoulder strap 30 comprises shoulder pad 31, strap adjuster 38 and end clips 27 and 28. Auxiliary strap 14 comprises strap guide 39, clip receiver 35. Auxiliary strap 16 comprises clip receiver 34 and strap guide 40. Clip receivers 34 and 35 are configured to receive end clips 27 and 28 of shoulder strap 30. Strap adjuster 38 is slidable to reduce or lengthen the effective length of the strap to fit a particular user. Strap guides 36, 38, 39 and 40 serve to receive the free strap ends of the corresponding straps 24, 26, 14 and 16 to guide them for secure placement on the hook and loop surfaces. Straps 14, 16, 22, 24 and 26 are preferably configured with hook and loop to secure the straps around a ladder frame member. Pouch 18 further comprises pocket 32, which is preferably located on the side of pouch 18 facing away from a user. The side of pouch 18 located on the portion adjacent a user preferably contains padding to reduce the effect of the weight of the ladder against a user (not shown). The opening for pocket 32 is preferably located on a perimeter side margin of pouch 18 such that when the ladder is deployed, the pocket faces more or less skyward (see FIG. 3). Those skilled in the art will understand that other types of straps may be employed without departing from the spirit and scope of the invention disclosed herein, such as the use of bungee cords, lashing straps, ratchet straps, cam buckle straps and the like. To use the ladder carrier system 10, ladder 100 is preferably placed on a surface in a horizontal orientation, and pouch assembly 17 is placed at a mid-point between the ends of ladder 100. The straps of pouch assembly 17 are secured around an upper frame rail 23 of ladder 100. Cinch strap 24 is preferably secured around all rail sections of frame rail 23, if the ladder has multiple rails. Auxiliary straps 14 and 16 are placed outboard of pouch assembly 17, on either side. Clips 27 and 28 are then secured to clip receivers 34 and 35 to support shoulder strap 30.

FIG. 3 illustrates ladder carrier system 10 in its stowed configuration. Pouch 18 comprises pockets 32 and 33 which each have a dimension of approximately that of pouch 18. Pouch 18 has a preferred width of between 9 and 12 inches, and a preferred height of between 6 and 10 inches. As can be seen in FIG. 3 pocket 32 access is oriented more or less upward in the stowed position, allowing for strap storage of Auxiliary straps 14 and 16 and shoulder strap 30. Pocket 32 may also be used for the storage of other items. Pocket 33 is accessed from the opposite end of pouch 18 and is useful in the same manner as pocket 32, if the ladder, in use, finds pocket 33 orientated skyward.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. A ladder carrier system adapted to be attached to a ladder to assist in the ladder's transportation, comprising:

- a pouch assembly comprising a pouch having a top perimeter, a bottom perimeter, a left side perimeter, a right side perimeter, a front side and a back side, the pouch assembly left side perimeter having a first strap secured thereto at a point adjacent to the top perimeter thereof, the pouch assembly right side perimeter having a second strap secured thereto at a point adjacent to the top perimeter thereof;
- a cinch strap attached adjacent to the first strap and having a length greater than a length of the first strap;
- a first auxiliary strap, the first auxiliary strap comprising a strap guide and a first clip receiver;
- a second auxiliary strap, the second auxiliary strap comprising a strap guide and a second clip receiver;
- a shoulder strap having a first end and a second end, the shoulder strap first end having a first clip integrated therewith, the shoulder strap second end having a second clip integrated therewith, and wherein the first clip and the second clip are configured to be securely received by the first and second clip receivers.

2. The ladder carrier system of claim 1 wherein the shoulder strap further comprises a shoulder pad.

3. The ladder carrier system of claim 1 wherein the pouch assembly right side perimeter comprises a pouch opening.

4. The ladder carrier system of claim 1 wherein the pouch assembly top perimeter comprises a handle secured thereto.

5. The ladder carrier system of claim 1 wherein the pouch assembly further comprises a pocket.

6. The ladder carrier system of claim 1, wherein the first clip receiver has a longitudinal axis configured to be oriented along a longitudinal axis of the ladder when the first auxiliary strap is coupled to the ladder.

7. The ladder carrier system of claim 1, wherein the second clip receiver has a longitudinal axis configured to be oriented along a longitudinal axis of the ladder when the second auxiliary strap is coupled to the ladder.

8. The ladder carrier system of claim 1, wherein the pouch assembly further comprises a handle attached to and extending along the top perimeter of the pouch.

9. The ladder carrier system of claim 8, wherein the pouch assembly is coupled to a portion of the ladder at a location between the first auxiliary strap and second auxiliary strap coupled to a portion of the ladder, wherein the shoulder strap and handle can be simultaneously used.

10. A ladder carrier system comprising:

- a ladder comprising a pair of spaced apart rails and a plurality of spaced apart rungs attached to and extending between the pair of spaced apart rails;
- a pouch assembly removably attachable to a portion of the ladder, the pouch assembly comprising:
  - a pouch having a top perimeter, a bottom perimeter, a left side perimeter, a right side perimeter, a front side and a back side;
  - a first strap attached to the left side perimeter;
  - a second strap attached the right side perimeter;
  - a cinch strap attached adjacent to a portion of the first strap or the second strap, the cinch strap having a length greater than a length of the first strap, wherein the cinch strap is removably attachable to one or more rails the ladder;
- a shoulder strap assembly removably attachable to a portion of the ladder, the shoulder strap assembly comprising:
  - a first auxiliary strap removably attachable to a rail of the ladder, the first auxiliary strap comprising a strap guide and a first clip receiver;
  - a second auxiliary strap removably attachable to a rail of the ladder, the second auxiliary strap comprising a strap guide and a second clip receiver;
  - a shoulder strap having a first clip attached to a first end of the shoulder strap and a second clip attached to a second end of the shoulder strap, wherein the first clip and the second clip are configured to be securely received by the first and second clip receivers.

11. The ladder carrier system of claim 10, wherein the pouch assembly further comprises one or more pockets.

12. The ladder carrier system of claim 10, wherein the first clip receiver has a longitudinal axis configured to be oriented along a longitudinal axis of the ladder when the first auxiliary strap is coupled to the ladder.

13. The ladder carrier system of claim 10, wherein the second clip receiver has a longitudinal axis configured to be oriented along a longitudinal axis of the ladder when the second auxiliary strap is coupled to the ladder.

14. The ladder carrier system of claim 10, wherein the pouch assembly further comprises a handle attached to and extending along the top perimeter of the pouch.

15. The ladder carrier system of claim 14, wherein the pouch assembly is removably attached to a portion of the ladder at a location between the first auxiliary strap and second auxiliary strap removably attached to a portion of the ladder, wherein the shoulder strap and handle can be simultaneously used.

16. The ladder carrier system of claim 11, wherein the one or more pockets are oriented along right perimeter, left perimeter, or both the left perimeter and right perimeter.

17. The ladder carrier system of claim 10, wherein the cinch strap is configured to extend about two rails of the ladder simultaneously.

* * * * *